July 7, 1959
W. R. WALKER
2,893,408
DISH WASHERS
Filed April 12, 1955
5 Sheets-Sheet 2
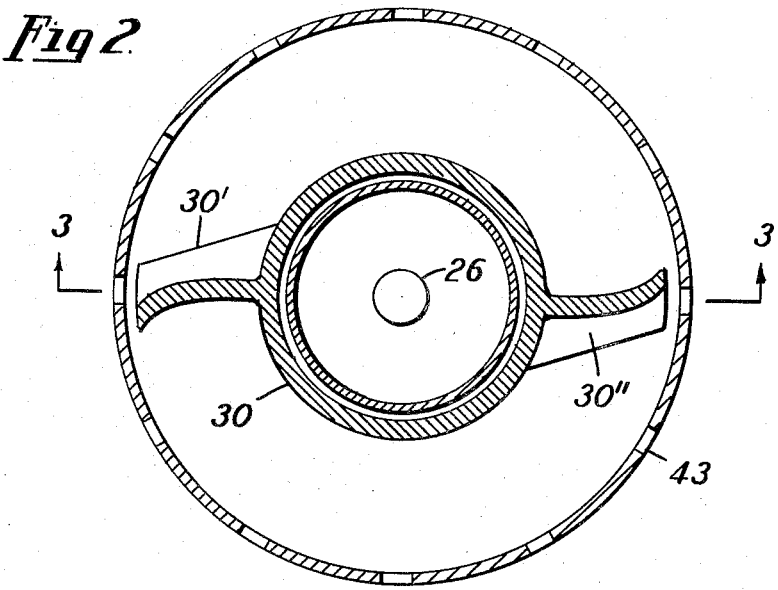
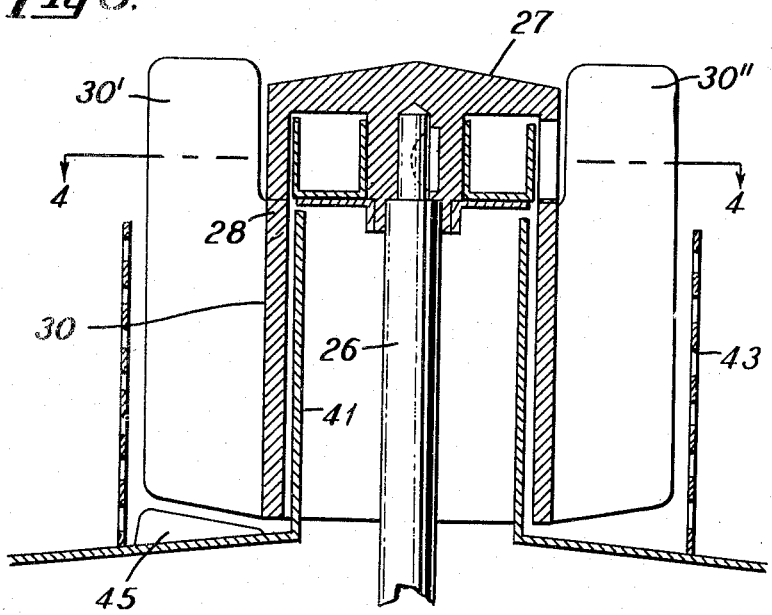
INVENTOR.
WILLARD R. WALKER
BY Robert V. Morse, Atty.

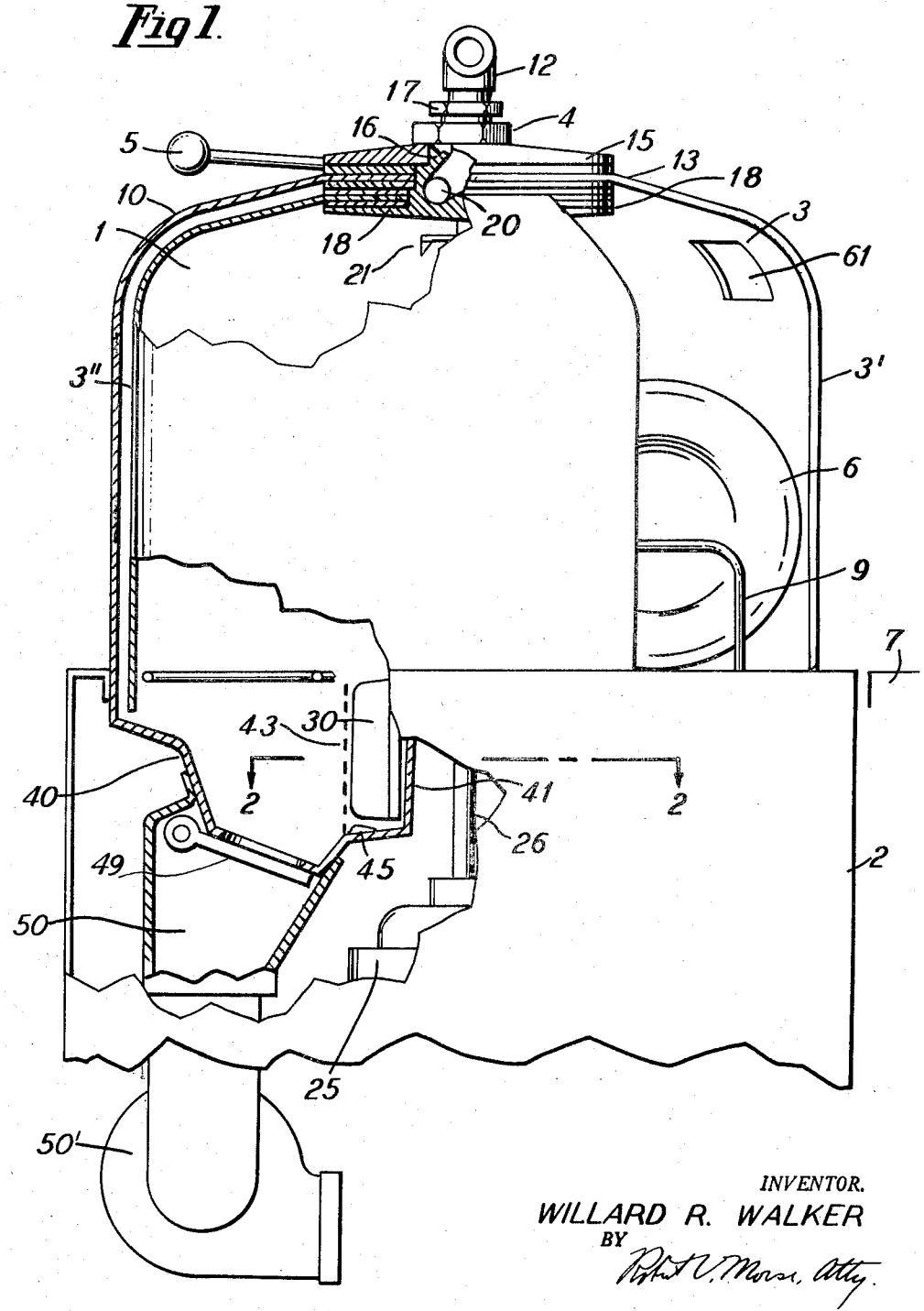

July 7, 1959  W. R. WALKER  2,893,408
DISH WASHERS

Filed April 12, 1955  5 Sheets-Sheet 3

INVENTOR.
WILLARD R. WALKER
BY
Robert V. Morse, Atty.

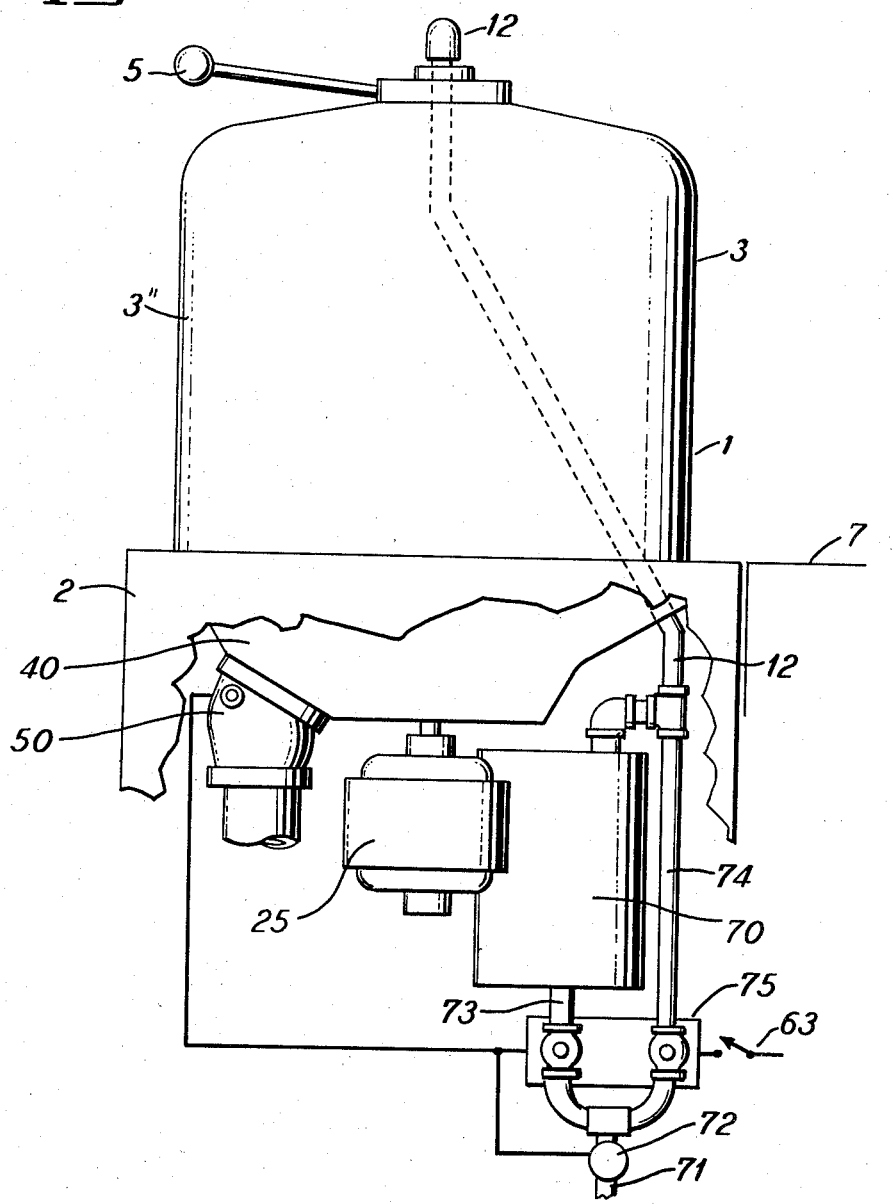

July 7, 1959  W. R. WALKER  2,893,408
DISH WASHERS

Filed April 12, 1955  5 Sheets-Sheet 5

FIG. 7

CYCLE OF OPERATION

I PRELIMINARY
   MAIN SWITCH ON
   DRAIN VALVE OPEN
   FLOW FROM MAIN TANK
   VIA AUXILLIARY TANK

II WASH
   TIMER RUNS
   DRAIN VALVE CLOSED
   WATER HOT FROM MAIN TANK
   AUXILLIARY TANK CLOSED
   WITH HEATER ON
   MOTOR RUNS FORWARD

III FIRST DRAIN
   MOTOR RUNS BACKWARD
   DRAIN VALVE OPENS

IV FIRST RINSE
   DRAIN VALVE CLOSED
   FLOW FROM MAIN TANK
   MOTOR RUNS FORWARD

V SECOND DRAIN
   MOTOR RUNS BACKWARD
   DRAIN VALVE OPENS

VI FINAL RINSE
   DRAIN VALVE CLOSED
   AUXILLIARY TANK FLOW
   MOTOR RUNS FORWARD

VII DRYING
   MOTOR RUNS BACKWARD
   DRAIN VALVE OPEN
   AIR VALVE OPEN

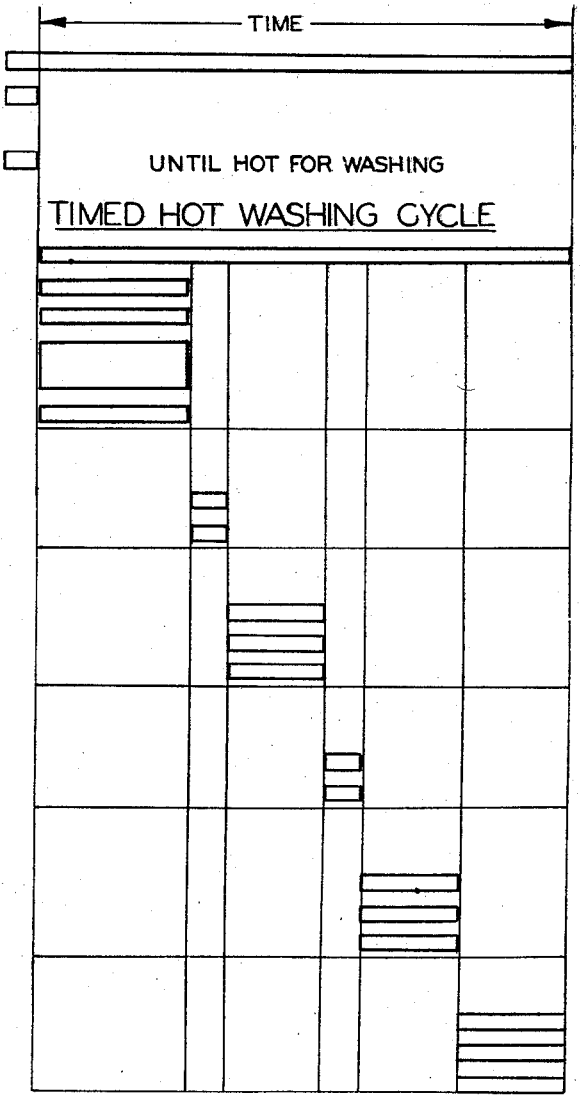

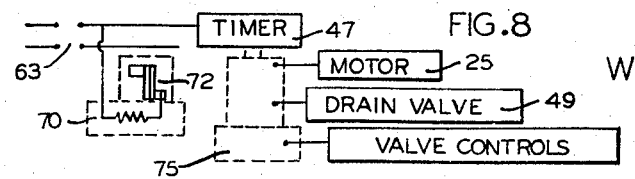

FIG. 8

INVENTOR.
WILLARD R. WALKER
BY Robert V. Moran
   Atty.

United States Patent Office 2,893,408
Patented July 7, 1959

2,893,408

DISH WASHERS

Willard R. Walker, Syracuse, N.Y.

Application April 12, 1955, Serial No. 500,720

6 Claims. (Cl. 134—57)

This invention relates to automatic machines for the washing and drying of dishes such as might be used in homes or in small eating places. Its general purpose is to give a high standard of cleanliness and sanitation, a low consumption of electricity, a minimum use of super-hot water and a short overall period for washing and drying. In furtherance of this purpose the various elements have been improved and combined in such a way that each helps the other or serves a double purpose, so that some parts heretofore required can now be omitted while others can work more quickly and effectively to carry thru the washing and drying cycle. For example, the opening and closing door which is pivoted and constitutes part of the body has the water supply coming in at top center so as to initially flush the dishes with each intake of water. This obtains some benefit from the very first, even before the water is hot, and before the main washing starts. When the motor starts to work, its impeller rotates in one direction to wash the dishes and then in the other direction in such a manner as to shorten the drain period; and this also operates in the first rinse and in the final rinse period, with each drainage operation accelerated by reversing the same impeller. A combination of tanks insures sufficient hot water to wash and dry quickly, and in the drying the same impeller becomes a fan to blow the moist air out of the wash chamber so as to speed up the drying operation. Such coordination not only reduces the overall time required but also simplifies the machinery and tends to reduce the cost of construction and operation. Various other improvements in relation thereto will become apparent as the description proceeds.

Referring now to the drawings forming part of this specification,

Fig. 1 is a front elevation of the machine with the door partly open, showing the motor, the wash chamber, the body and the external connections for the water intake and drainage.

Fig. 2 is a cross-sectional view on the line 2—2 of Fig. 1.

Fig. 3 is a vertical cross-sectional view on the line 3—3 of Fig. 1 and Fig. 2, showing the construction of the principal internal parts.

Fig. 6 is a diagram of the hot water tanks and their control valves and piping.

Fig. 7 is a diagram of the successive operations induced by the automatic controls.

Fig. 8 is a circuit diagram for the time control.

Similar reference numerals refer to similar parts throughout the various views.

Figure 4:
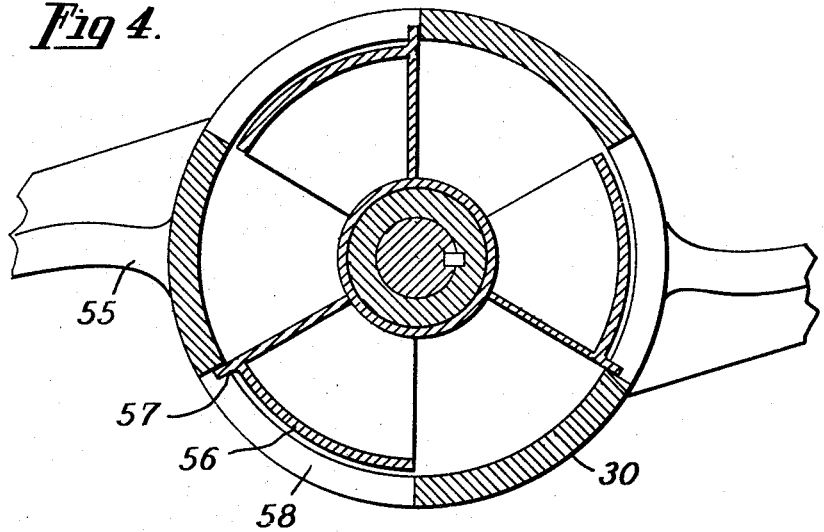
Fig. 4 is a detail view of the impeller and principal associated parts showing the air valve closed as in washing.

Referring now to Fig. 1, the dish washing machine 1 is preferably mounted on a rectangular base 2 so as to fit readily in the usual space near a work table; and on this base 2 is carried the main body or casing 3 in which the dishes are placed to be washed, rinsed and dried. This body 3 has a semi-cylindrical rear portion 3' which is fixed in place by being permanently attached to the base 2, and also has a movable front portion 3" of similar contour but slightly different diameter which is pivotally mounted on the rear casing 3' at the center point 4 so that it can be turned by the handle 5 to either close the body portion 3 or by a half turn in the other direction to open the body 3 to receive or remove the dishes 6. This casing or body 3 is located above the level of the work table 7 so that the dishes 6 can be inserted or removed from the racks 9 without stooping and lifting.

Taking up the rear body casing 3' and front rotatable shell or door 3" more in detail, the fixed rear casing 3' which is permanently mounted on the base 2 has a semi-circular top 10 forming part of the rear casing and at the center point thereof is an opening for the incoming water pipe 12 through which hot water can enter the machine, and also a central bearing plate 13 carried by the fixed top 10 on which is rotatably mounted the door 3", this door being slightly smaller in diameter so as to be able to turn inside the casing 3'. The mounting for the rotatable door 3" consists of a rotatable top plate 15 secured to a central stub shaft 16 having a gland 17 turning on the downward extension of the fixed water pipe 12, together with a somewhat similar rotatable lower plate 18 also carried on the stub shaft 16 to which is fastened the rotatable shell or door 3". When the handle 5 is turned the stub shaft 16 and door 3" are rotated, a half turn sufficing to fully open or close the casing 3. Such a structure moves easily, gives a wide opening, requires no door clearance on either side of the machine, and has the further advantage that water can be introduced to the machine at a central point above the dishes in the casing.

For that purpose the water flows in through the pipe 12, gland 17 and hollow stub shaft 16 to the orifice 20 below which is located a butterfly diffuser 21 which sprays the water outward over the dishes 6 in the racks 9. When the machine is first started up the water in the pipes is not generally hot enough to be used for the timed dishwashing cycle and so it is generally allowed to pass out thru the drain in the ordinary machine without starting up the motor. If such water enters the casing anywhere except at the central top as above described it is practically wasted. In the present construction it at least serves to give the dishes a preliminary rinse and in so doing makes possible a diminution in the time of the principal washing cycle when the machine goes into more active operation.

Of course the principal washing operation is done in a much more vigorous manner by the motor driven mechanism to be described. The driving motor 25 is located in the base portion 2 below the body casing 3 and generally below the level of the work table 7, and the motor is provided with a drive shaft 26 to the top of which is fastened a disk or cap 27 having on its periphery spaced bosses 28 to which are fastened the dasher blades or impeller 30 whose function it is to throw the water vigorously against the dishes so as to wash them. The cap 27 also contains a special inertia air valve which will be described later.

Taking up first the function of the dasher 30 in washing and rinsing the dishes, this dasher or impeller 30 has two blades 30' and 30" extending substantially vertically as shown but with a somewhat different pitch so that one of them will throw the water droplets higher than the other, and by thus throwing the water in different directions serve to strike the dishes in many different ways to dislodge the particles of food. This spray of hot water in all directions is thrown with great force and velocity by the high speed motor, and it is the repeated impact of these particles of hot water that supplies the mechanical scrubbing effect to clean the dishes as well as the usual solvent effect of the hot water and soap or other detergent. It has been found that two blades of different configuration or pitch are more effective than two blades of the same shape, though in either case the machine may appear full of spray. This is probably because the food particles are subjected to a cross-fire to dislodge them when the impeller blades differ in conformation in the machine. This is true both for washing and for rinsing.

After the water strikes the dishes in the racks it runs down to the bottom of the machine which consists of an annular pan 40 secured at its rim to the upper back casing 3. This plan 40 has a central opening with a watertight cylindrical wall 41 extending up above the water level in the machine, that is, to a point slightly below the dasher cap 27, while the diameter of this wall 41 is slightly less than the inner diameter of the dasher body 30 so that the rotating parts 27 and 30 have a small running clearance. A short distance outside the tips of the dasher blades 30 is an annular screen 43 extending above the normal water level of the machine and generally slightly lower than the inner annular wall 41. The water falling down from the dishes when the machine is in operation must pass thru this screen 43 in order to return to the impeller 30, and in so doing deposits the food particles on the outside of the screen 43. After the water passes thru the screen 43 it is directed by the fixed baffles 45 to enter the impeller blades 30' and 30" at the bottom, such baffles serving to check the whirling of the water at that point so that the rotating blades will strike it with the necessary impact to throw it against the dishes as described.

After the washing cycle or rinsing cycle the exterior of the screen 43 tends to be coated with food particles which should run down the drain 50 thru the valve 49 when it is opened, together with other food particles that have fallen to the bottom of the pan 40. For good results it is essential that both the screen and the pan be flushed vigorously; and to do this the motor 25 is reversed, which causes the impeller 30 to drive the water downward and outward thru the screen 43 instead of upward. This not only cleans the screen between cycles of operation, but also accelerates the flow down the drain 50 and cleans out the bottom of the pan 40 so that the next operation gets a clear start.

Figure 5:
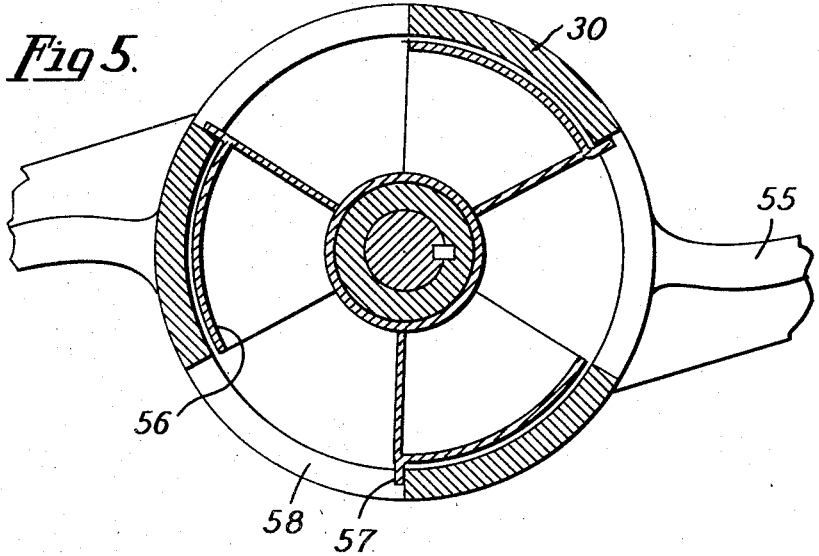
Fig. 5 is a similar detail view with the air valve open as in draining or drying.

In order to rinse well, or to dry well, it is highly desirable to blow out the steamy vapor that rises from the hot dishes and tends to fill the casing. If this excessive humidity can be rapidly removed the hot dishes will dry themselves very quickly. In the present device the removal of the steamy air is accomplished in the following manner. Under the impeller cap 27 is a fan 55 having a loosely mounted shutter valve 56 preferably in segmental form as shown more in detail in Fig. 4 and Fig. 5. When the motor 25 and impeller 30 are rotating in the direction to throw the washing water against the dishes, as in the washing and rinsing cycles, the loose shutter 56 by its inertia remains against the abutment 57 while its shutter closes the openings 58 thru which air might otherwise enter. But when the motor 25 is reversed as described to turn the impeller 30 so as to drive the waste water down the drain, the lag or inertia of the loosely mounted shutter 56 throws the shutter the other way immediately that the motor starts up in the other direction, thus uncovering the openings 58 and admitting air from the opening made by the wall 41 in the annular bottom pan 40. Furthermore, the impeller blades 30' and 30" then act as a centrifugal fan or blower to drive the air into the casing where the dishes are located and so force the steamy air out of the vent 61 in the casing 3. For draining the machine, in some installations a pump 50' may be used to assist the flow in the drain 50, and may serve as a valve in place of a separate valve in the drain 50.

In all washing machines the control of water temperature is essential for best results. Sterilized dishes are now called for by health departments, institutions and public eating places of all kinds, and sterilized dishes are also of course desirable in the home. While the temperature for washing dishes should preferably not be above 150° F., for final rinse and to sterilize to desired standards the water should be up to about 185°–190° F. Also the operations should be carefully timed. Automatic timers 47 for any series of steps are in common use on many machines and can be readily adapted to the cycles herein set forth, so that the internal construction of such electrical timers need not be described in detail here. The elements which are controlled by such timers and their sequence of operations involve a coordination of the motor, its starting and reversing switch, the drain valve, valves in the normal hot water supply, and super-hot rinsing water supply, as well as time elapse valves and safety circuits thru the main switch 63 and the door 3" as well as elsewhere if desired, so that the machine cannot run except under proper conditions.

The usual household hot water tank can supply water suitable for dishwashing at say 150° F. and in sufficient quantity, but that is not hot enough for rinsing and sterilizing. Accordingly, the machine includes a small auxiliary hot water tank 70 which is electrically heated and thermostatically controlled to maintain the temperature at about 185°–190° F. The incoming hot water main 71 from the household or restaurant tank carries an electro-thermostat 72 which holds open the drain 50 until the flowing water temperature reaches about 140° F. so as not to load the machine with too cold water. This preliminary water flow is thru the pipe 73 and thru the tank 70 to the inlet water pipe 12 at the top of the machine from which it sprays down over the dishes and out the drain 50 as previously described. When the flowing water reaches a temperature of say 140°–150° or whatever is the desired temperature for washing, the thermostat 72 starts the cycle in the automatic valve control box 75 which contains the thermo-electric and measuring valves. This sends a measured amount of water thru the pipe 74, by-passing the tank 70, closes the drain valve 49, and permits the motor 25 to start the washing operation.

Meanwhile the heater in the auxiliary hot water tank 70 has been turned on, preferably when the main switch is closed, so the water in that tank can be heating up to get ready for rinsing at say 185°–190° F. while the washing is taking place. For rinsing operations the motor is reversed and the impeller helps to drive the used water down the drain. The timing of the various operations may be varied as desired according to the set-up of the electrically operated measuring valve and controls, but a typical sequence and timing of operations may be given as follows.

I. *Preliminary*

(a) Machine open, drain valve open.
(b) Operator puts loaded racks in the machine.
(c) Operator closes machine which closes main switch. Thermo-electric valve to auxiliary hot water tank opens, water flows thru the auxiliary tank of the machine and when water reaches 140°–150° F. this valve closes.
(d) Measuring valve opens, measured quantity of hot water flows direct to wash chamber. Drain valve closes, motor starts. Timer starts. Electric heater in auxiliary hot water tank turns on to bring it up to about 190° for later use in final rinsing.

II. *Wash period*

(a) Measuring valve closes with correct amount of water in wash chamber, motor runs in forward direction and the washing begins.
(b) About two or three minutes later the motor stops and the first wash period ends.

III. *First drain period*

(a) Motor starts in reverse direction.
(b) Drain valve opens.
(c) About 15 seconds later the motor stops.

IV. *First rinse period*

(a) Drain valve closes.
(b) Measuring valve opens, admitting hot rinsing water.
(c) Motor starts in forward direction.
(d) About half a minute later measuring valve closes and motor stops.

V. *Second drain period*

(a) Motor starts in reverse direction.
(b) Drain valve opens.
(c) About 15 seconds later the motor stops.

VI. *Final rinse period*

(a) Drain valve closes.
(b) Measuring valve opens, admitting super-hot water from the auxiliary tank in the correct amount and then closes.
(c) Motor starts in forward direction.
(d) About two minutes later the motor stops.

VII. *Drying period*

(a) Motor starts in reverse.
(b) Drain valve opens.
(c) Since motor is in reverse, the inertia valve opens blowing air thru the wash chamber and expelling the humidity. In about a minute or two the hot sterilized dishes are dry and clean.
(d) The motor then stops, and the machine can either be left ajar or be opened for the removal of the dishes.

It will be understood that the operations a, b, c, etc. in each period are not necessarily successive, but may overlap or be simultaneous in various degrees where possible to save time. It will be seen that the novel arrangement of door, impeller, inertia air valve, and timing of the steps in relation to each other and to the auxiliary super-hot water tank all cooperate to produce a practical machine suitable for the average home or small establishment. The cost of such a machine is of course less than when more complicated installations are used.

While I have in the foregoing described certain specific forms by way of example, it will be understood that they are merely for purposes of illustration to make clear the principles of the invention, which is not limited to the particular forms shown but is susceptible to various modifications and adaptations in different installations as will be apparent to those skilled in the art without departing from the scope of the invention as stated in the following claims.

I claim:

1. In a dishwashing machine, the combination of a body in which dishes may be placed to be washed, said body comprising a fixed rear portion and a movable front portion serving as a door thru which dishes may be placed in the machine, said front portion being pivotally mounted at the top in relation to the fixed rear portion, a source of hot water, an intake water pipe leading from said source of hot water to said top, and a diffuser in the top of said body and below the water intake to throw the incoming water over the dishes for a preliminary rinse, a drain valve in the bottom of the body which is normally closed, an electrical thermo-valve mechanism for holding said drain valve open during said preliminary rinse until the water temperature is hot enough for dishwashing, and an electrically operated dish washing mechanism operatively connected to said thermo-valve mechanism for taking over a dishwashing operation of the machine thereafter.

2. In a dishwashing machine, the combination of a casing, a rack within said casing in which dishes may be placed to be washed, a water intake for said casing, a base of said casing, an impeller in the lower portion of said casing, said impeller having inclined blades, a motor for driving said impeller to throw water against the dishes in the rack from which it flows down to the impeller again, a drain in said base by which food particles from the dishes may be drawn off, and an electrical timer control means for reversing said motor and impeller so as to throw the water back outward and downward to assist in flushing the food particles down the drain.

3. In a dishwashing machine, the combination of a casing, a rack within said casing in which dishes may be placed to be washed, a water intake for said casing, a base for said casing, an impeller inside said base, said impeller having inclined blades of different pitch so as to throw water in different directions, a drain in said base and outside said impeller to carry away the food particles washed down from the dishes, a motor for driving said impeller, and an electrical timer control means for reversing said motor and impeller so as to throw the water back outward and downward to assist in flushing food particles down the drain.

4. In a dishwashing machine, the combination of a casing, a rack within said casing in which dishes may be placed to be washed, a water intake for said casing, a base for said casing, an impeller within said base, a screen outside said impeller thru which water returning from the dishes must pass to reach the impeller again, a drain in said base and outside said screen to carry away food particles washed down from the dishes, a reversible electric motor for driving said impeller so that rotation in one direction will throw water up against the dishes and rotation in the other direction will help flush the water out thru the screen and down the drain, an electrical timer control means for reversing said motor and impeller, and an inertia operated air valve mounted on said impeller to admit air to the casing when it is emptying so as to hasten the drying of the hot dishes after they have been washed.

5. In a dishwashing machine, the combination of a casing, a rack within said casing in which dishes may be placed to be washed, a vent in said casing, a water intake for said casing, said casing having a base, a drain in said base, a reversible electric motor below said base having a shaft extending up thru said base, an impeller on said shaft and in the base of the casing for dashing water against said dishes, said impeller having blades inclined at angles to said shaft so as to throw water up against the dishes to wash them when the motor runs in one direction and down to the drain when the motor runs in the reverse direction, an electrical timer control means for reversing said motor and impeller, said impeller having a channel to admit a flow of air to the casing, and an air valve controlling said flow of air so as to be closed when the dishes are being washed and the impeller is turning in one direction and open when the impeller is turning in the reverse direction so as to blow hot vapor out of the vent.

6. In a dishwashing machine, the combination of a casing, a rack within said casing in which the dishes may be placed to be washed, a water intake for said casing, a base, a drain in said base, an impeller, a motor for driving said impeller, an electrically operated timing and temperature control mechanism for the water, a main hot water supply feeding said intake, an auxiliary hot water tank for feeding said intake, said auxiliary tank having an electric heater to raise its temperature above that of the main hot water supply, and electrically operated valves operatively connected with said tank and supply respectively and operated by said timing and temperature control mechanism to connect them to the water intake for the casing, said mechanism including control elements for the valves placed in such order that they first direct the water flow thru the auxiliary tank to the washer for preliminary rinse until the water in the auxiliary tank becomes as hot as the main supply, then secondly direct the water from the main supply into the casing of the dishwashing machine to wash and partially rinse the dishes while stopping the flow thru the auxiliary tank so that said tank may heat above the temperature of the main supply, and thereafter stop the direct flow of the water from the main supply and reopen the flow of the higher temperature water from the auxiliary tank for final rinsing to further heat the dishes for sterilizing and drying, and an air blower for evacuating the hot vapor from the casing to accelerate the drying.

References Cited in the file of this patent

UNITED STATES PATENTS

| | | |
|---|---|---|
| 2,287,628 | McMahan | June 23, 1942 |
| 2,692,604 | Walker | Oct. 26, 1954 |
| 2,704,082 | Jackson | Mar. 15, 1955 |
| 2,704,083 | Low | Mar. 15, 1955 |